(12) United States Patent
Verbin et al.

(10) Patent No.: US 6,520,744 B1
(45) Date of Patent: Feb. 18, 2003

(54) METHOD AND APPARATUS FOR IMPROVING PERFORMANCE OF A SPLITTERLESS ASYMMETRIC DIGITAL SUBSCRIBER LINE (ADSL)

(75) Inventors: Rami Verbin, Tel-Aviv (IL); Dudi Baum, Ramat-Gan (IL); Eliahu Shusterman, Kfar-Saba (IL); Ilan Sharfer, Rishon-Letzion (IL)

(73) Assignee: Orckit Communications Ltd., Tel-Aviv (IL)

( * ) Notice: Subject to any disclaimer, the term of this patent is extended or adjusted under 35 U.S.C. 154(b) by 0 days.

(21) Appl. No.: 09/472,108

(22) Filed: Dec. 27, 1999

Related U.S. Application Data

(63) Continuation-in-part of application No. 09/314,243, filed on May 18, 1999.

(51) Int. Cl.$^7$ ............................................. H04M 11/06
(52) U.S. Cl. .................... 416/377; 379/93.01; 370/252; 375/222
(58) Field of Search .............................. 379/93.01, 416; 370/252

(56) References Cited

U.S. PATENT DOCUMENTS 6,324,268 B1 * 11/2001 Balachandran et al. .. 379/93.08
6,345,071 B1 *  2/2002 Hamdi ........................ 375/222

* cited by examiner

*Primary Examiner*—Fan Tsang
*Assistant Examiner*—Daniel Swerdlow
(74) *Attorney, Agent, or Firm*—Darby & Darby

(57) ABSTRACT

A method for communicating at least one of the hook state and associated in line filter indication from the ADSL Transceiver Unit-Remote Side to the ADSL Transceiver Unit-Central Office, or vice versa, for improving the performance of splitterless ADSL systems. This information is used to determine robust bits and gain allocation during startup, and to correct the profile selection during fast retrain.

12 Claims, 13 Drawing Sheets

METHOD AND APPARATUS FOR IMPROVING PERFORMANCE OF A SPLITTERLESS ASYMMETRIC DIGITAL SUBSCRIBER LINE (ADSL)

CROSS-REFERENCE TO RELATED APPLICATIONS

The present invention is a continuation-in-part of U.S. patent application Ser. No. 09/314,243, filed on May 18, 1999, which is hereby incorporated herein by reference, in its entirety.

BACKGROUND OF THE INVENTION

Field of the Invention

The present invention relates generally to voice and data communications over digital subscriber lines and, more particularly, to a method and apparatus for improving the performance of a splitterless Asymmetric Digital Subscriber Line (ADSL).

BACKGROUND OF THE INVENTION

While telephone lines are useful for data communications using modems, the data rates that can be achieved over ordinary telephone lines are rather limited. Attempts have been made to re-engineer existing telephone lines for digital data communications. These include Integrated Services Digital Network (ISDN) and, more recently, Digital Subscriber Lines (DSLs). Since most computer users tend to receive more data than they send, Asymmetric Digital Subscriber Lines (ADSLs) having different bandwidths for reception and transmission have been favored over regular DSLs.

In order to maximize the utility of the existing copper cable plant, ADSL has been implemented to allow an ordinary POTS ("plain old telephone service") communication channel to coexist with the ADSL data communication capacity. However, originally, ADSL required a POTS splitter to be installed at the point where the ADSL enters a business or residence. The POTS splitter separated the POTS communication channel from the ADSL data communication channel allowing ordinary telephone instruments to receive/transmit over the POTS communication channel without the need for any sort of adapters.

Unfortunately, a certain amount of specialized knowledge is required in order to properly install the POTS splitter. Thus, a version of ADSL known as splitterless ADSL or G.Lite was developed. Splitterless ADSL avoids the need for a POTS splitter at the customer premises. However, since there is no splitter to separate the ADSL data from the POTS voice signals, the ADSL signal is present at telephone jacks throughout the subscriber's home or business. This ADSL signal may become corrupted if incompatible telephone instruments are plugged into the telephone jacks.

The G.Lite variant of ADSL has also been referred to as universal ADSL, by the Universal ADSL Work Group (UAWG). One of the goals of UAWG is to develop an ADSL technology that allows simple modem installation by the end user. This refers to G.Lite's promise to allow telephone companies to provision ADSL and allow customers to set up G.Lite DSL connections on their own—without the delay and expense of a telephone company service call.

The standard for G.Lite arises from a series of technical requirements which were approved at the October, 1998, meeting of the ITU (International Telecommunications Union—a group headquartered in Geneva, Switzerland). The ITU's Study Group 15 Q4 called the technology G.Lite. The ANSI (American National Standards Institute) T1/E1.4 committee and the ADSL Forum (an industry group) call it splitterless ADSL or Lite ADSL.

The original installation concept in ADSL required a centralized POTS splitter to be installed on the telephone line usually at the NID (network interface device). The purpose of this POTS splitter is to split the frequency range into two isolated bands—a telephone (POTS) band and an ADSL band.

The implications of the above installation concept are that installation of the POTS splitter is non-trivial and that there is a need to install new wiring from the NID to the ADSL modem. As a result, installation of ADSL will not be readily installed by end users. It will require, in most cases, the assistance of the telephone company.

The G.Lite modem uses the existing home wiring (used today for POTS), so the installation becomes simple. G.Lite and POTS operate together on the same internal home wiring system, allowing the customer to plug both a telephone and a modem into a standard wall telephone outlet.

When a phone goes off hook, noise is generated from the phone in the same frequency range as the ADSL signal (because of non-linear effects). Furthermore, the impedance of an off hook phone may be so low that it essentially shunts the strength of the ADSL signal. The increase of noise and decrease of signal will usually cause errors in the ADSL signal, which will require a re-start process in order to re-sync. The opposite can happen as well. The ADSL signal can sometimes be heard as an annoying sound in the telephone.

A small lowpass filter (inline filter) may be installed in series with the telephone apparatus to filter out the interference between the data signals and the voice signals. The inline filter behaves as a distributed POTS splitter, i.e., instead of installing a splitter at the NID, as with splitter-based ADSL modems, the customer may instead install an inline filter on the most problematic phones, or even on all phones.

When the inline filter (low-pass filter) is installed between the wall jack and the telephone, it isolates the phone from the modem. The phone will not influence the modem and the ADSL transmit signals will be filtered out before entering the phone.

In order to cope with the disruptive interference of phones on the ADSL signal and the annoying interference of ADSL signals into a telephone when an inline filter is not used, the modem must retrain when one of the phones goes off hook. This fast retrain takes about one or two seconds and allows the modem to adapt itself to the new condition.

During the fast retrain, the service stops and is reestablished afterwards. This interruption is undesirable and is considered to be one of the main disadvantages of G.Lite. Putting the phone back on-hook requires another fast retrain routine since the off hook settings of the modem are not optimal for the on-hook case.

G.Lite modem installation involves the use of at least one inline filter in the majority of homes. Inline filtering may be required in order to make G.Lite work at fast bit rates or in some cases to allow it to work at all.

A significant percentage of corded phones require an inline filter in order to meet minimum standards for audible interference in the off hook condition. However, some cordless phones do not require an inline filter and behave as if an inline filter is already installed inside. In both cases (phones with inline filters and some cordless phones), fast retrain for the modem is not always a necessity when phones go off hook or return to on-hook.

However, the presence of certain telephones requires a modem to retrain when the telephones transition between on-hook and off hook states. Thus, a technique is needed to distinguish efficiently between situations where retraining is needed and where it is not.

SUMMARY OF THE INVENTION

The present invention provides a method and apparatus for improving the performance of splitterless ADSL systems. While ideally users would install lowpass filters on all telephones when using splitterless ADSL, it can be expected that users will neglect to do so in some cases. Some telephones, when switching between on-hook and off hook states, will cause interference with ADSL data, while others will not. The present invention provides a uniform technique for adapting an ADSL system to any of these situations. The invention provides a graduated approach to handling anomalies that may be caused by incompatible telephone equipment.

In accordance with one embodiment of the present invention, the hook state information and in line filter indication is communicated from the ADSL Transceiver Unit-Remote side (ATUR) to the ADSL Transceiver Unit-Central Office side (ATUC). This indication informs the ATUC whether a phone, not having an ILF, has been taken off hook, hereinafter referred to as an "OffHook-NILF" indication. The dynamic properties (i.e. behavior over time) of the measured SNR in splitterless ADSL systems varies significantly between on hook and off hook states. In particular, when a phone not having an ILF has been taken off hook, the SNR varies significantly, e.g. approximately 35 db to approximately 40 db, over time as function of the voice signal introduced into the mouthpiece. The OffHook-NILF indication is therefore used to determine robust bits and gain allocation during startup and also to correct the profile selection during fast retrain. In an alternative embodiment, the "OffHook-NILF" indication may be detected by the ATUC side and communicated to the ATUR.

In an alternative embodiment, instead of determining whether the telephone that has been taken off hook has an associated in line filter, it may be assumed that the telephone does not have an associated in line filter, whereby the OffHook-NILF indication is used to account for expected noise fluctuation.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

The present invention is directed to a method and apparatus for improving the performance of a splitterless ADSL system. The invention provides benefits for both improved data communications and improved voice communications. The procedure for managing decisions to retrain the ADSL modems reduces the amount of time the ADSL is unavailable for data communications. According to the present invention, an adaptive attenuation technique reduces the likelihood that transmitted ADSL data will interfere with telephone conversations conducted over the POTS feature of the ADSL. For the on hook case, the adaptive attenuation technique decreases the non-linear behavior of the phone, thus improving the modem's performance.

Figure 1:
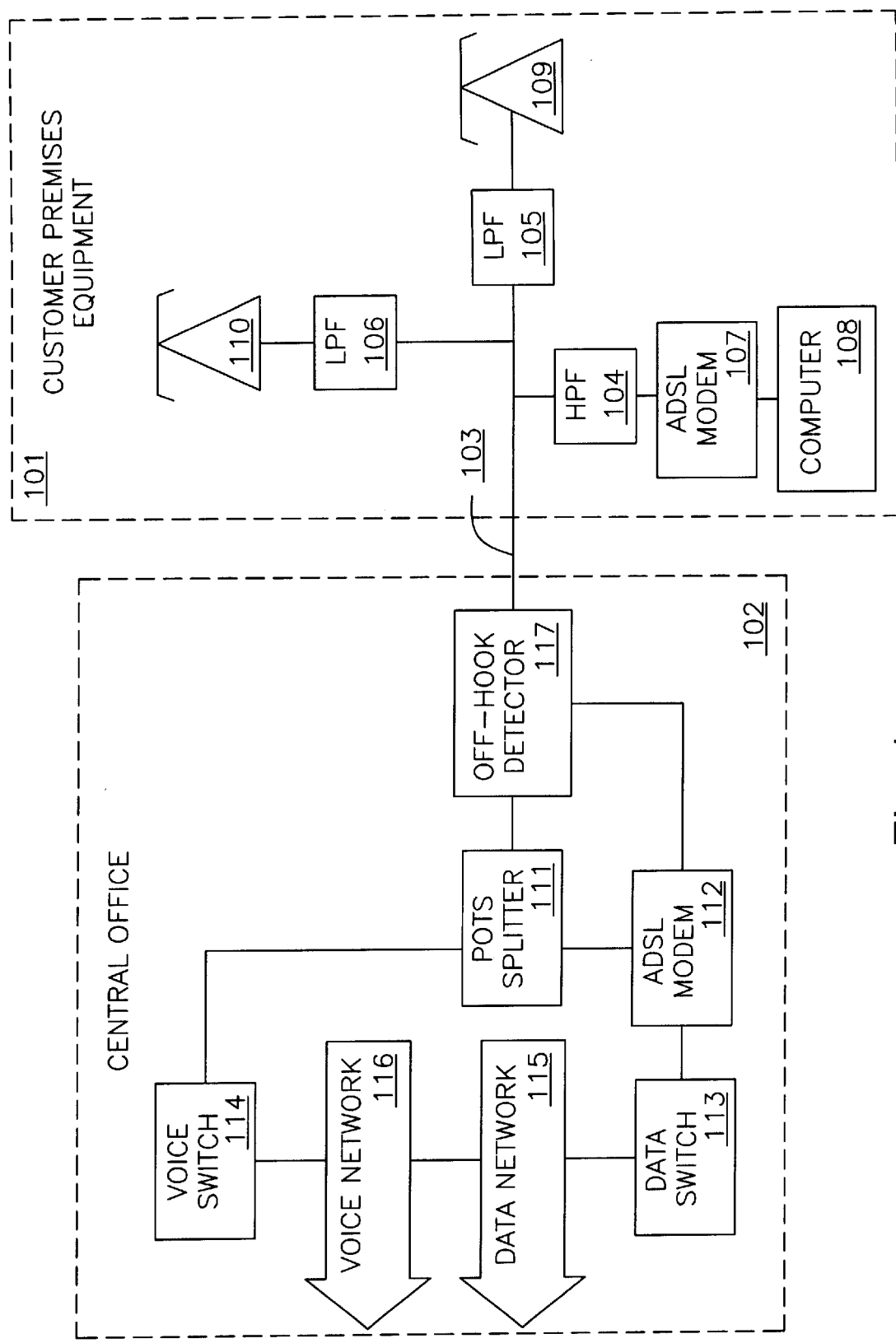
FIG. 1 is a block diagram illustrating an embodiment of the present invention with off hook detection occurring at the ADSL Transceiver Unit-CO side (ATUC)

FIG. 1 is a block diagram illustrating an embodiment of the present invention with off hook detection occurring at the ADSL Transceiver Unit-CO side (ATUC). Customer premises equipment (CPE) 101 is coupled to central office (CO) 102 via digital subscriber line (DSL) 103. CPE 101 includes highpass filter 104, lowpass filters 105 and 106, ADSL modem 107, computer 108, and telephone instruments 109 and 110. Computer 108 is coupled to ADSL modem 107, which is coupled to highpass filter 104, which is coupled to DSL 103. Telephone instrument 109 is coupled to lowpass filter 105, which is coupled to DSL 103. Telephone instrument 110 is coupled to lowpass filter 106, which is coupled to DSL 103.

CO 102 includes off hook detector 117, POTS ("plain old telephone service") splitter 111, ADSL modem 112, data switch 113, voice switch 114, data network 115, and voice network 116. DSL 103 is coupled to off hook detector 117, which is coupled to POTS splitter 111. Off hook detector 117 also provides an output to ADSL modem 112. POTS splitter 111 is coupled to voice switch 114 and to ADSL modem 112. ADSL modem 112 is coupled to data switch 113. Voice switch 114 is coupled to voice network 116. Data switch 113 is coupled to data network 115.

Off hook detector 117 monitors the electrical characteristics of DSL 103 to determine the status of the hookswitches of telephone instruments 109 and 110. Off hook detector 117 can detect if either or both of telephone instruments 109 and 110 go to an off hook state. For example, off hook detector 117 can monitor the voltage across DSL 103 or the current through DSL 103 to determine the status of the hookswitches. Since closure of a hookswitch causes considerable current to flow through the subscriber loop, current through DSL 103 can be readily detected. For example, a low-value resistor may be placed in series with DSL 103 and the voltage across the resistor measured to determine current flow. Alternatively, current flow may be detected using other devices, such as optocouplers or mechanical sensors. Since subscriber loops typically have a high source impedance, substantial voltage drops tend to occur as current through the loop increases. For this reason, current flow can be detected by simply measuring the voltage across DSL 103 without the need to insert additional components in the current path.

Since this embodiment involves detection of an off hook condition using an off hook detector at CO 102, procedures for accommodating the off hook condition are initiated at CO 102. If off hook detector 117 detects a change of hookswitch status, it passes a signal to ADSL modem 112. ADSL modem 112 initiates testing to determine if a modem retraining routine is indicated. If so, it communicates this information to ADSL modem 107 at CPE 101 via DSL 103. ADSL modem 112 and ADSL modem 107 then determine and implement any required retraining routine and reestablish an efficient communications link.

Figure 2:
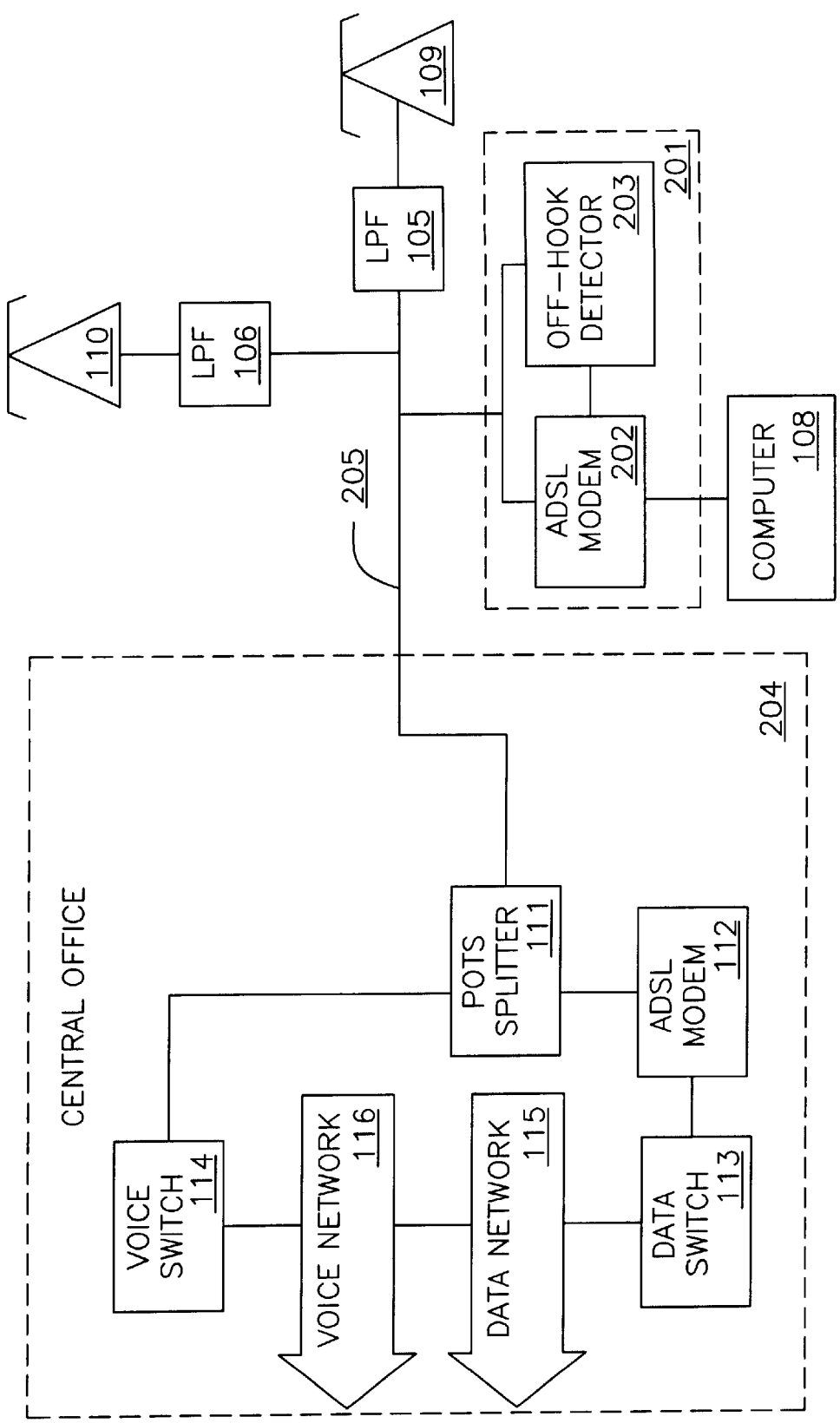
FIG. 2 is a block diagram illustrating an embodiment of the invention with off hook detection occurring at the ADSL Transceiver Unit-Remote side (ATUR)

FIG. 2 is a block diagram illustrating an embodiment of the invention with off hook detection occurring at the ADSL Transceiver Unit-Remote side (ATUR). CO 204 includes POTS splitter 111, ADSL modem 112, data switch 113, voice switch 114, data network 115, and voice network 116. DSL 205 is coupled to POTS splitter 111. POTS splitter 111 is coupled to ADSL modem 112 and voice switch 114. ADSL modem 112 is coupled to data switch 113. Data switch 113 is coupled to data network 115. Voice switch 114 is coupled to voice network 116.

At the customer premises side, computer 108 is coupled to ADSL interface 201. ADSL interface 201 includes ADSL modem 202 and off hook detector 203. ADSL modem 202 is coupled to off hook detector 203. ADSL modem 202 and off hook detector 203 are coupled to DSL 205. Telephone instrument 109 is coupled to lowpass filter 105, which is coupled to DSL 205. Telephone instrument 110 is coupled to lowpass filter 106, which is coupled to DSL 205.

Off hook detector 203 is coupled to DSL 205 and is configured to detect the status of any hookswitch associated with any telephone instrument on DSL 205, for example telephone instruments 109 and 110. Off hook detector 203 may be configured in any manner that allows it to detect the electrical characteristics of DSL 205. As an alternative, off hook detector 203 may be interposed between ADSL modem 202 and DSL 205.

Since off hook detector 203 is associated with ADSL modem 202 of the CPE, requests for corrective action arising from the sensing of hookswitch events will be initiated by ADSL modem 202 of the CPE. If appropriate, ADSL modem 202 transmits a request via DSL 205 to ADSL modem 112 to arrange whatever action may be indicated, for example, performing an echo channel measurement or initiating a request for retraining.

Figure 3:
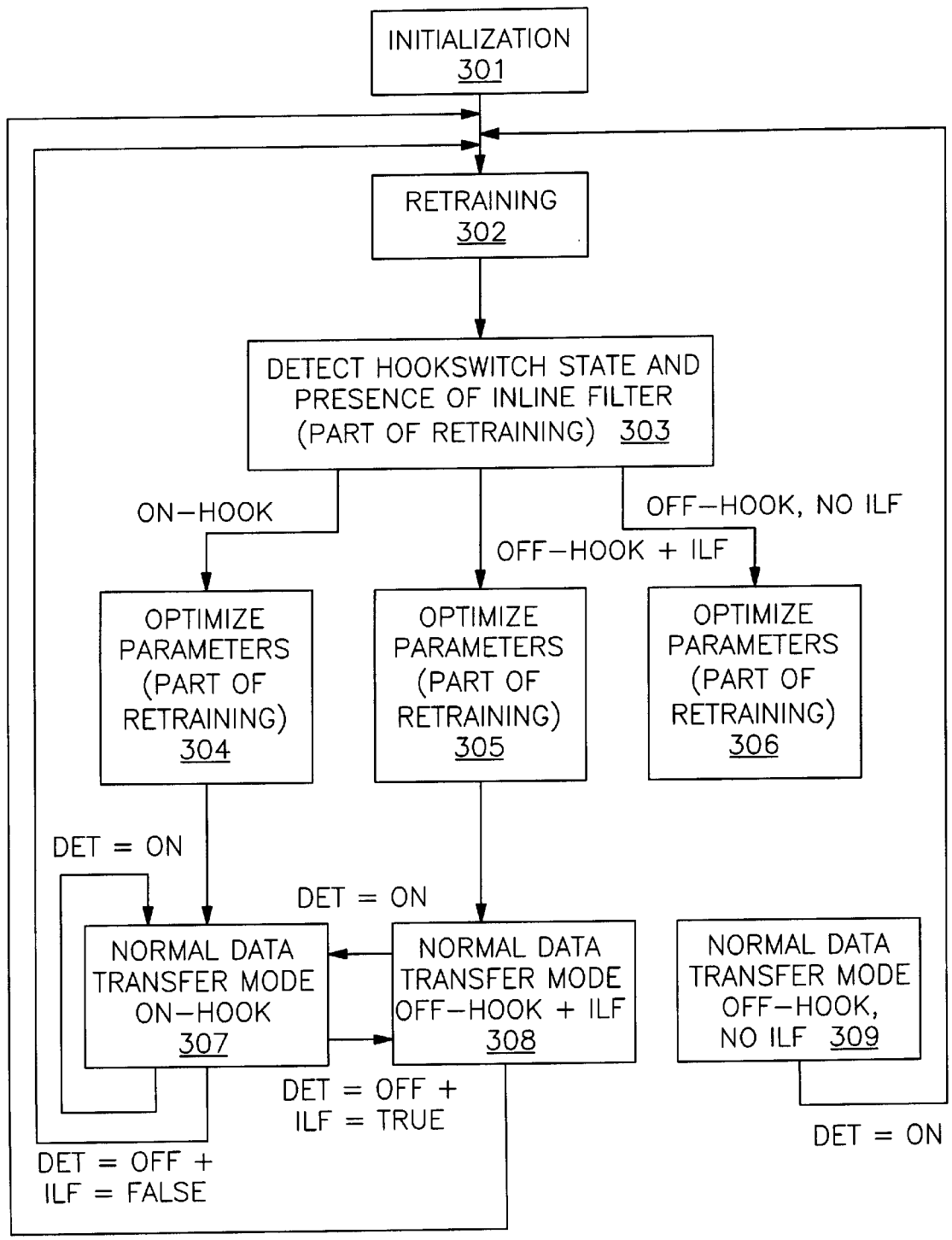
FIG. 3 is a flow diagram illustrating a process for controlling retraining or adaptive attenuation according to one embodiment of the invention.

FIG. 3 is a flow diagram illustrating a process for controlling retraining or adaptive attenuation according to one embodiment of the invention. The process begins at step 301 and relies on two main inputs: "Det" and "ILF". "Det" (off hook DETector) is the output of the off hook detector referred previously as 117 or 203. "Det=on" means that the off hook detector has detected an on hook state and "Det=off" means that the off hook detector has detected an off hook state. The "ILF" (In Line Filter) indication is an internal indication based on measured vectors such as channel response, echo response, etc. "ILF=true" means that an inline filter was detected. "ILF=false" means that an inline filter was not detected, i.e., at least one of the phones that is currently off hook does not have the protection of an inline filter.

In step 302, a retrain process starts. It may be a full startup sequence or a reduced subset of this process usually known as fast retrain. In step 303, a decision is made as to the new hookswitch status. This status is a combination of the on/off hook state and the existence of inline filter in series with the off hook phone. The hookswitch information may be provided by off hook detector 117 or off hook detector 203, depending on the particular configuration being used. The existence of the inline filter may be found based on various indicators such as estimation of the channel response, echo channel, noise floor, etc. For example, if the echo response during off hook matches the echo response that was measured during on hook state, this indicates off hook with ILF in place. From step 303, the process continues to steps 304, 305, or 306, depending on the off hook/on-hook state and the presence or absence of an ILF. If an on-hook state is detected, the process proceeds to step 304. If an off hook state is detected and an ILF is present, the process proceeds to step 305. If an off hook state is detected and an ILF is not present, the process proceeds to step 306.

In steps 304, 305, and 306, optimization occurs. This optimization is fully carried out during installation. A subset of it will be performed during full startup and a smaller subset will be performed during fast retrain. The optimization function optimizes the following parameters: transmit power, data rate, bit loading, and gains allocation. It should be noted that different optimization may be carried out as a function of a phone's state. Normal data transfer mode steps (i.e., states during which the modem is capable of receiving and transmitting user data) 307, 308, 309 follow the optimization phase. Step 307 follows step 304. Step 308 follows step 305. Step 309 follows step 306.

In steps 304, 305, 306, a decision is made as to whether or not power adjustment is needed. If the power level at which the data communications signals are being transmitted is too high, it is more likely to interfere with any telephone apparatus (on or off hook) that is also coupled to the DSL. If the power level is too low, it is more likely to cause errors in the data communications. Thus, if an adjustment of the power level is needed, the power level is adjusted in steps 304–306. If no adjustment of power level is needed or after a power adjustment is completed, the process continues to normal data transfer mode or state, steps 307–309.

Step 307 corresponds to a normal data transfer mode or state where all phones are on hook. If there has been no change in the hookswitch status, the process remains at this step. If, however, a change of hookswitch status has been observed, the process continues to step 302 or to step 308 according to the ILF state. If ILF=true, retraining will usually not be needed and step 308 follows. If ILF=false, the process moves to step 302 and retraining is performed. Retraining resets the modem parameters to conform to the actual conditions of the DSL using the reliable measurements available to the modem during the retraining procedure.

Step 308 corresponds to a normal data transfer mode state where an inline filter is installed on each of the off hook phones—at least one phone should be off hook in this step. Returning to on hook will be detected by the off hook detector 117 or 203. As a consequence, usually retraining will not be needed and the modem will return to step 307 without causing any service interruption. The ILF indication may change to false if another phone without ILF went off hook. In this case, retraining is needed and step 302 follows.

Step 309 corresponds to normal data transfer mode state where at least one phone went off hook and an inline filter is not installed on that off hook phone. Transition to on hook state in this step will cause retraining by returning to step 302.

It should be noted that transitions from normal data transfer mode states 307, 308, and 309 to retraining step 302 may also happen based on other parameters such as bit errors, low noise margin, rapid noise margin drop, loss of frame synchronization (LOF), etc. While off hook, these parameters may also serve as indicators for the existence of an ILF.

Figure 4A:
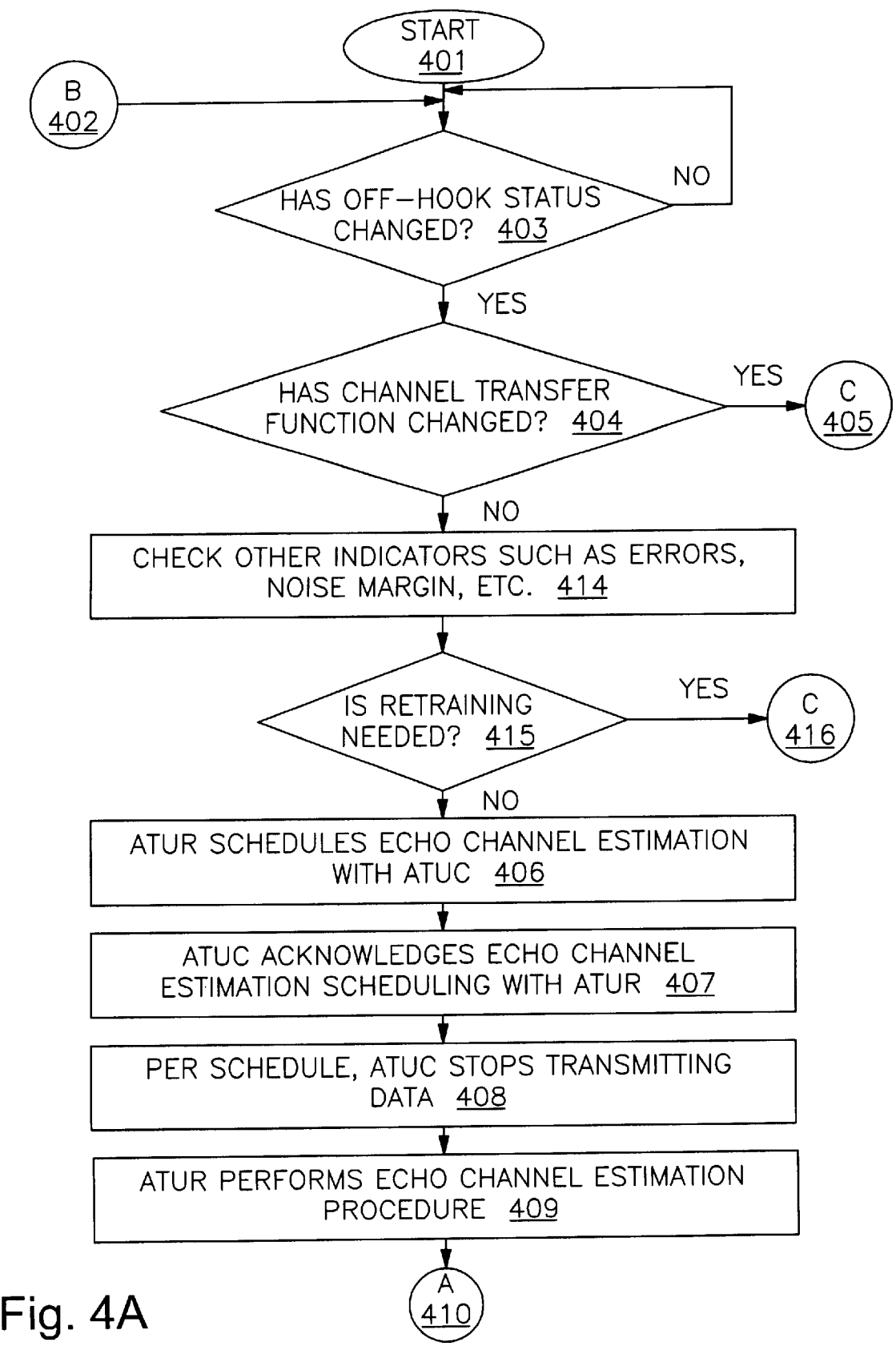
FIGS. 4A and 4B are a flow diagram illustrating a process for determining if retraining is needed and, if necessary, performing retraining according to one embodiment of the invention.
Figure 4B:
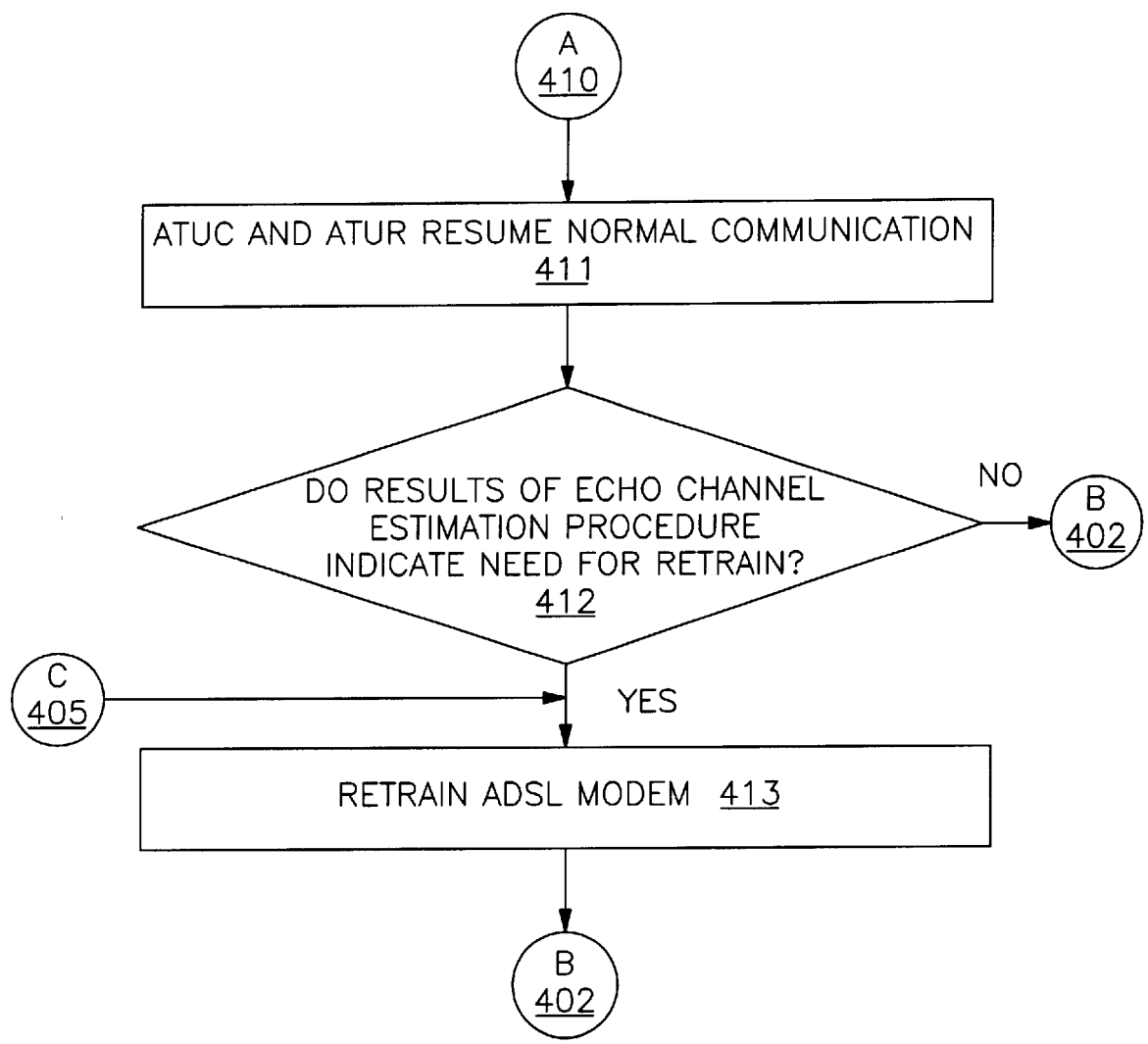

FIGS. 4A and 4B are a flow diagram related to a normal data transfer mode state when all phones are on hook. The figures illustrate a process for determining if retraining is needed and, if necessary, for performing retraining according to one embodiment of the invention. The process begins in step 401. In step 403, a decision is made as to whether or not the hookswitch status of any telephone instrument on the DSL has changed. If not, the process remains at step 403. If, however, a change in the hookswitch status has been detected, for example by off hook detector 117 or off hook detector 203, the process continues to step 404. At step 404, a decision is made as to whether or not the channel transfer function has changed. The transfer function characterizes how the channel will respond to signals applied to it. If the channel transfer function has changed, the process continues to step 413 via reference 405 assuming off hook state without ILF. In step 413, modem retraining is performed to adapt the modems to the new transfer function. If, in step 404, the transfer function is determined not to have changed, the process continues to step 414. Off hook with ILF is more likely in this case.

In step 414, other indicators are accumulated. These indicators include, among others, the following: error indication, noise margin, loss of frame (LOF), etc. These indicators are checked in step 415. If, for example, the noise margin drops significantly, retraining is performed in step 416. If the indicators show a possibility of continued operation, echo channel estimation is needed to complete the picture and verify that retraining (and power cutback) are not needed.

If retraining is not needed, then the process continues to step 406. In step 406, the ADSL transceiver unit—remote side (ATUR) schedules echo channel estimation with the ADSL transceiver unit—CO side (ATUC). In step 407, the ATUC acknowledges echo channel estimation scheduling with the ATUR. In step 408, according to the agreed schedule, the ATUC stops transmitting data. In step 409, the ATUR performs an echo channel estimation procedure by transmitting a known signal and monitoring the DSL to see how it responds to the known signal. From step 409, the process continues to step 411 via reference 410. In step 411, the ATUC and ATUR resume normal communications. In step 412, a decision is made as to whether or not the results of the echo channel estimation procedure indicate a need for retraining. If not, the process returns to step 403 via reference 402. If so, retraining is performed in step 413, and the process returns to step 403 via reference 402.

It should be noted that only short service interruption is needed in order to allow echo channel estimation. The estimation information gained from the echo channel estimation process allows a reliable decision regarding the need for retraining to occur in a time period which is much shorter than the a fast retrain time.

Figure 5:
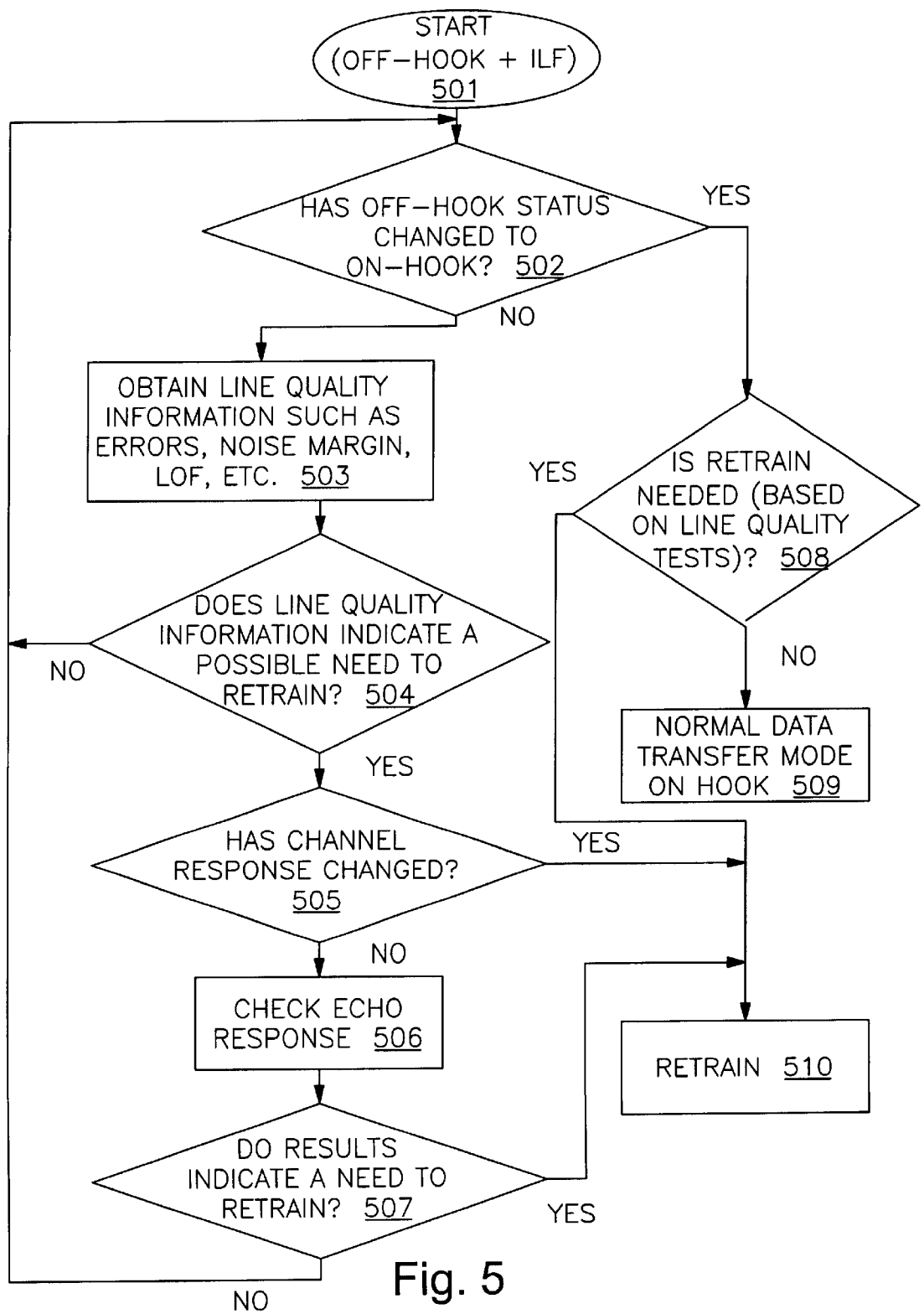
FIG. 5 is a flow diagram illustrating a process for determining if retraining is needed and, if necessary, performing retraining according to one embodiment of the invention.

FIG. 5 is a flow diagram that relates to a normal data transfer mode state when only phones with inline filters are off hook as shown in step 308 of FIG. 3. FIG. 5 illustrates a process for determining if retraining is needed and, if necessary, performing retraining according to one embodiment of the invention. The process begins in step 501. In step 502, a decision is made as to whether or not the hookswitch status of any telephone instrument on the DSL has changed. If on hook state has been detected, the need for retrain is tested based on a number of indicators such as errors, noise margin, etc. At step 508, if those indicators show a need for retraining, step 510 follows. If retrain is not needed, step 509, which corresponds to step 307 of FIG. 3, follows.

Step 503 will follow if the hookswitch status remains off hook. In this case, an event of a new off hook phone without the inline protection must be detected. Again a number of indicators such as errors, noise margin, etc. are used to decide in step 504 if there is a possible need for retraining. These indicators are not very reliable, so step 504 is used as a pre-filter before more CPU-consuming activities are performed. In step 504, a decision is made as to whether or not the line quality information indicates a possible need to retrain. If so, the process proceeds to step 505. If not, the process returns to step 502.

At step 505, a decision is made as to whether or not the channel transfer function has changed. The transfer function characterizes how the channel will respond to signals applied to it. If the channel transfer function has changed, the process continues to step 510. In step 510, modem retraining is performed to adapt the modem to the new transfer function. If, in step 505, the transfer function is determined not to have changed, the process continues to step 506.

In step 506, echo channel estimation is needed to assure complete evaluation of the communications channel. In step 506, the modem performs an echo channel estimation process as described in FIG. 4, steps 406–409. In step 507, a decision is made as to whether or not the results of the echo channel estimation procedure indicate a need for retraining. If not, the process returns to step 502. If so, retraining is performed in step 510.

Figure 6:
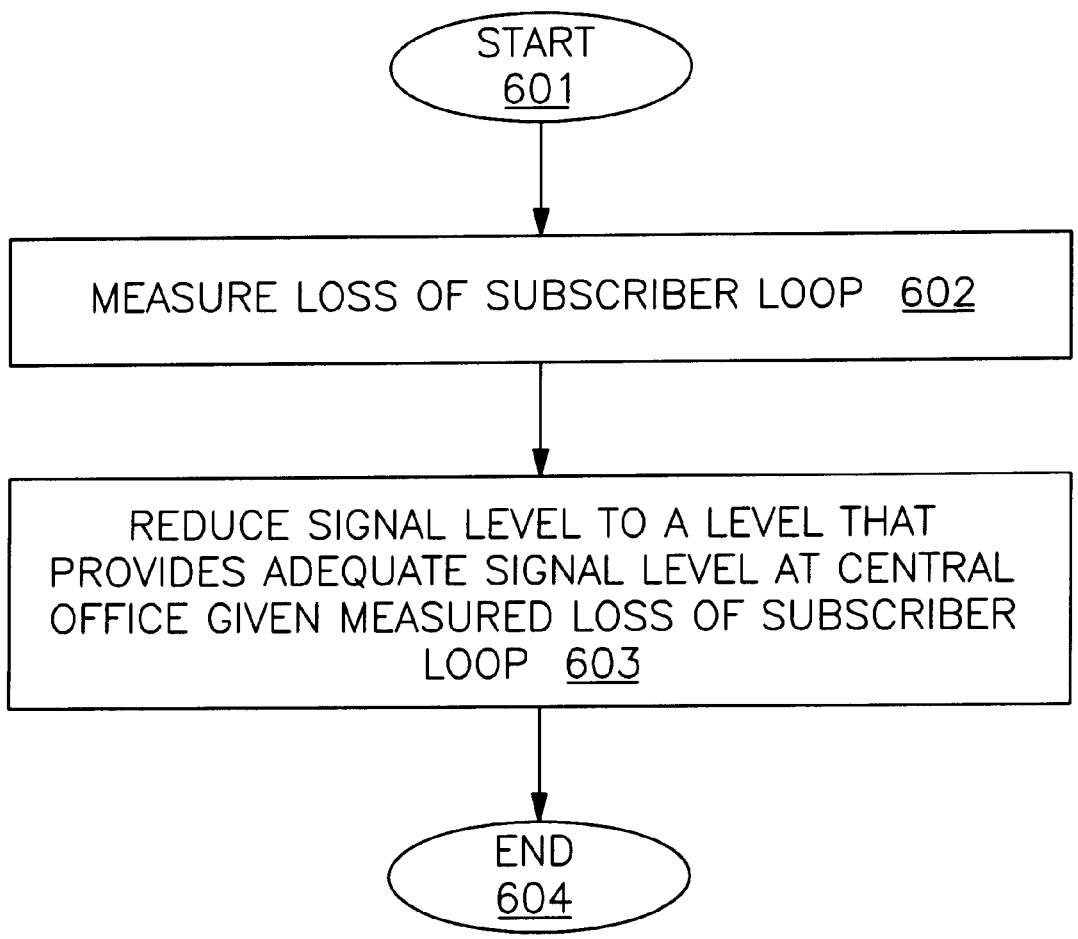
FIG. 6 is a flow diagram illustrating a process for adaptive attenuation according to one embodiment of the invention.

FIG. 6 is a flow diagram illustrating a process for adaptive setting of the transmit power according to one embodiment of the invention. The process begins in step 601. In step 602, a measurement is made of the signal attenuation associated with the subscriber loop. Alternatively, this information may be derived from parameters stored during the original modem training routine or the most recent retraining routine.

In step 603, an amount of signal level reduction is calculated based on the loss measurement obtained in step 602, the present signal level being transmitted, and the known minimum signal level requirements. The signal level reduction is calculated to ensure that an adequate signal level reaches the ADSL modem at the opposite end of the DSL with a reasonable safety margin, but that the signal level is near the minimum acceptable signal level. By minimizing the signal level, interference from telephone instruments that results in distortion of the ADSL modem signals is avoided.

A set of transmit levels (for example, two or more) may be calculated based on the measured line attenuation. The modem will automatically select the transmit level among the calculated levels. The customer can change the default selection and choose an alternative transmit level to better optimize modem performance as described in reference to FIG. 8.

Figure 7:
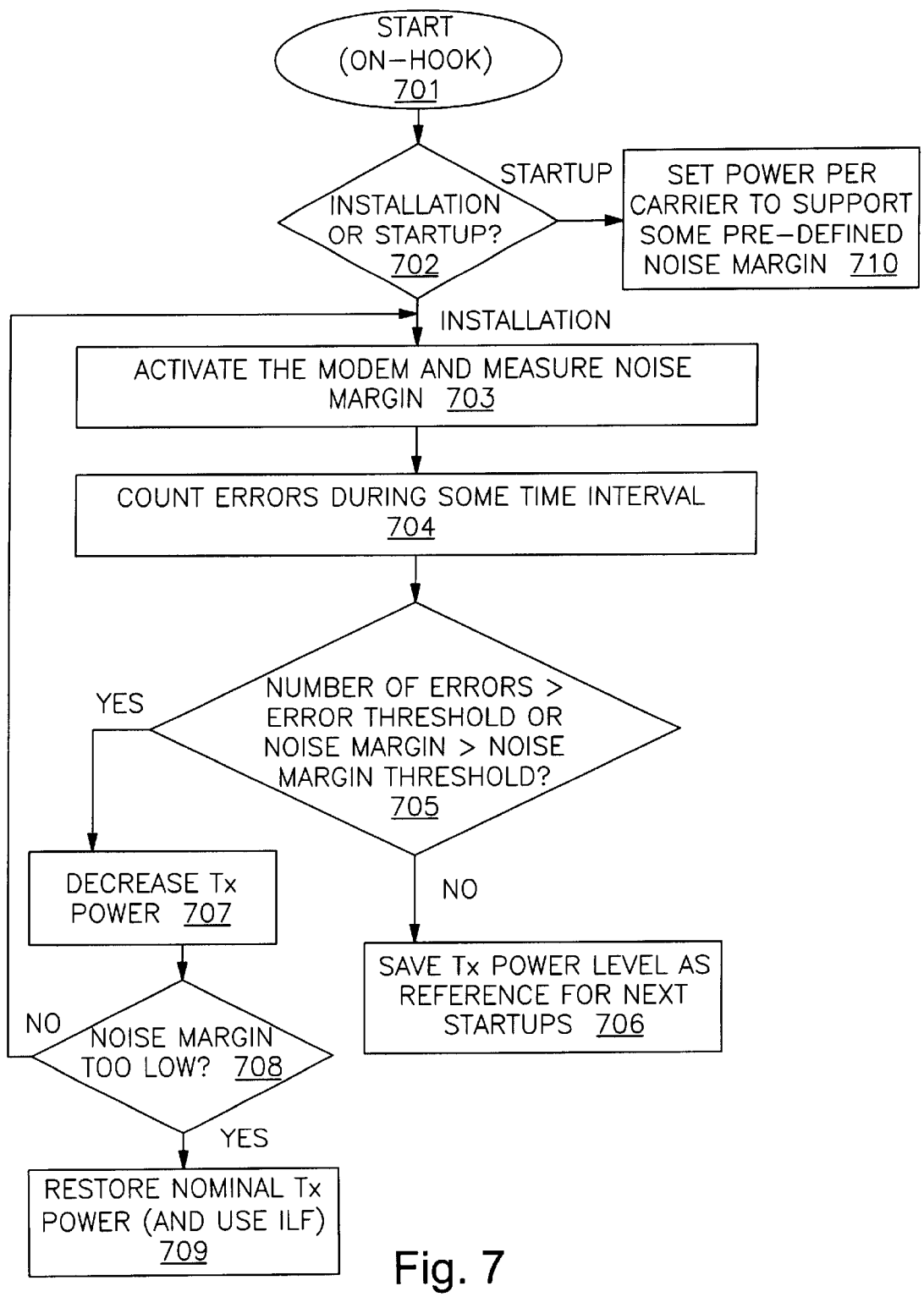
FIG. 7 is a flow diagram illustrating a process for adaptive attenuation according to one embodiment of the invention.

FIG. 7 is a flow diagram illustrating a process for adapting the transmit power during the on hook state. The process is activated if there is at least one phone which is not protected by an ILF. The figure relates to initial self calibration after first installation and to normal operation.

If the current operational phase is startup, step 710 follows 702. In step 710, during startup, the receiver allocates the minimal possible power per carrier that still allows operation with some pre defined data rate and some minimal pre-defined noise margin.

If the current state is "installation," step 703 follows. In step 703, the modem is activated and the noise margin is estimated. In step 704 (normal data transfer mode), the modem counts the number of errors during some pre-defined time period. In step 705, the number of errors and the estimated noise margin are compared to some pre-defined thresholds. If errors were not detected and the noise margin is below the threshold noise margin (i.e., not too high), the process ends in step 706. The transmit (Tx) power level is saved for future use.

The flow continues to step 707 if, at step 705, it is determined that the number of errors exceeds a predetermined error threshold or if the noise margin exceeds a predetermined noise margin threshold. Then, the transmit power is decreased at step 707. If the noise margin is too low (step 708), the process terminates at step 709. The nominal Tx power is then restored and the customer is provided with an indication that an ILF needs to be installed. If the noise margin is greater than a noise margin threshold, step 703 follows again.

Figure 8:
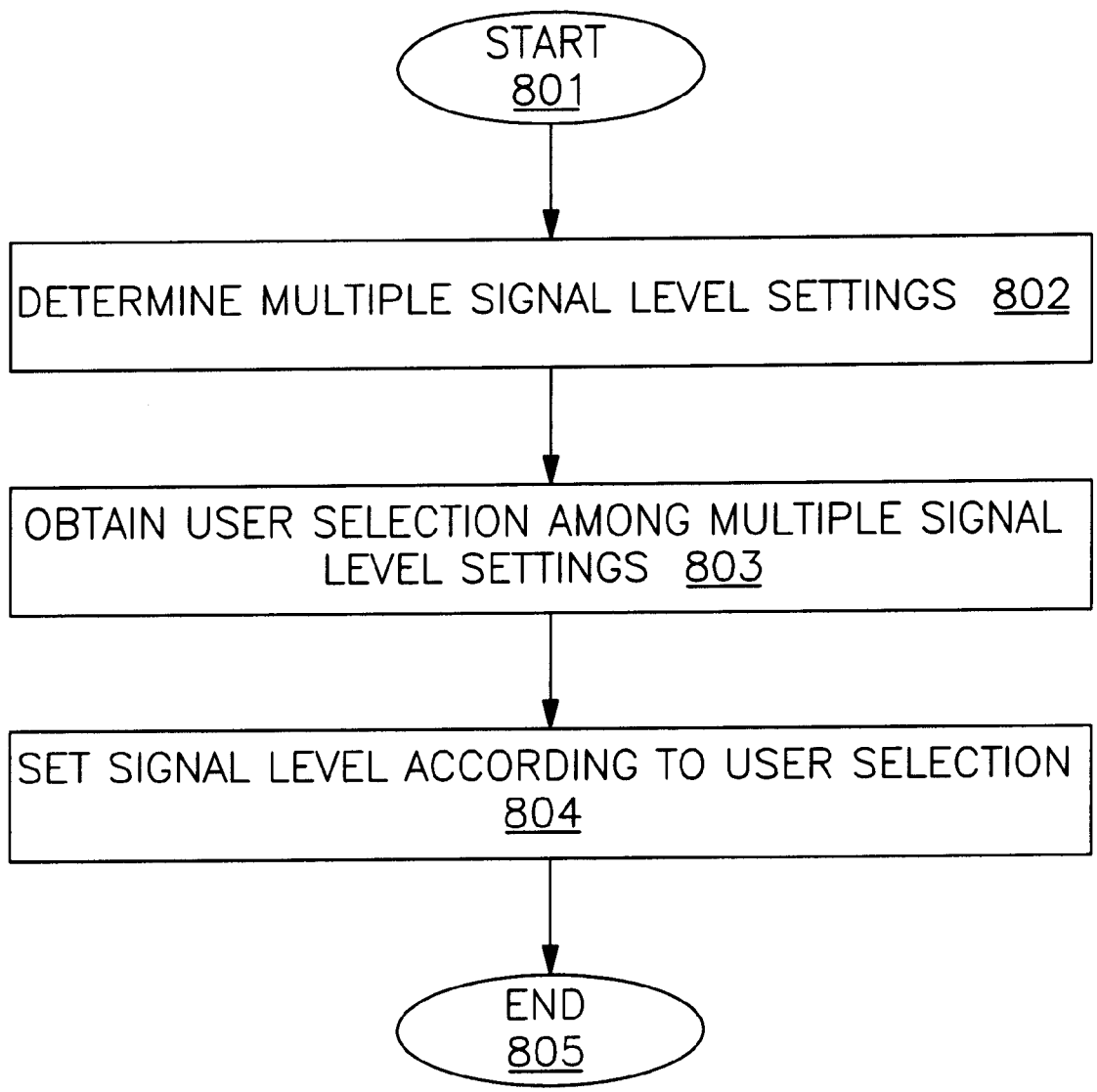
FIG. 8 is a flow diagram illustrating a process for user-selected adaptive attenuation according to one embodiment of the invention.

FIG. 8 is a flow diagram illustrating a process for user-selected adaptive attenuation according to one embodiment of the invention. The process begins in step 801. In step 802, multiple signal level settings are determined. For example, one setting might be the lowest possible signal level setting given the loss of the DSL and the minimum required signal level for reliable reception. Other settings might be incrementally higher signal levels. Another alternative is to adjust signal levels based on the measured line attenuation as described in reference to FIG. 6 above.

In step 803, a user selection is obtained from among the multiple signal level settings. The user might choose the lowest signal level setting to minimize interference with telephone instruments or a somewhat higher level setting to reduce the likelihood of errors resulting from an insufficient signal-to-noise ratio. In step 804, a signal level is set according to the selection obtained from the user in step 803. In step 805, the process ends.

Figure 9:
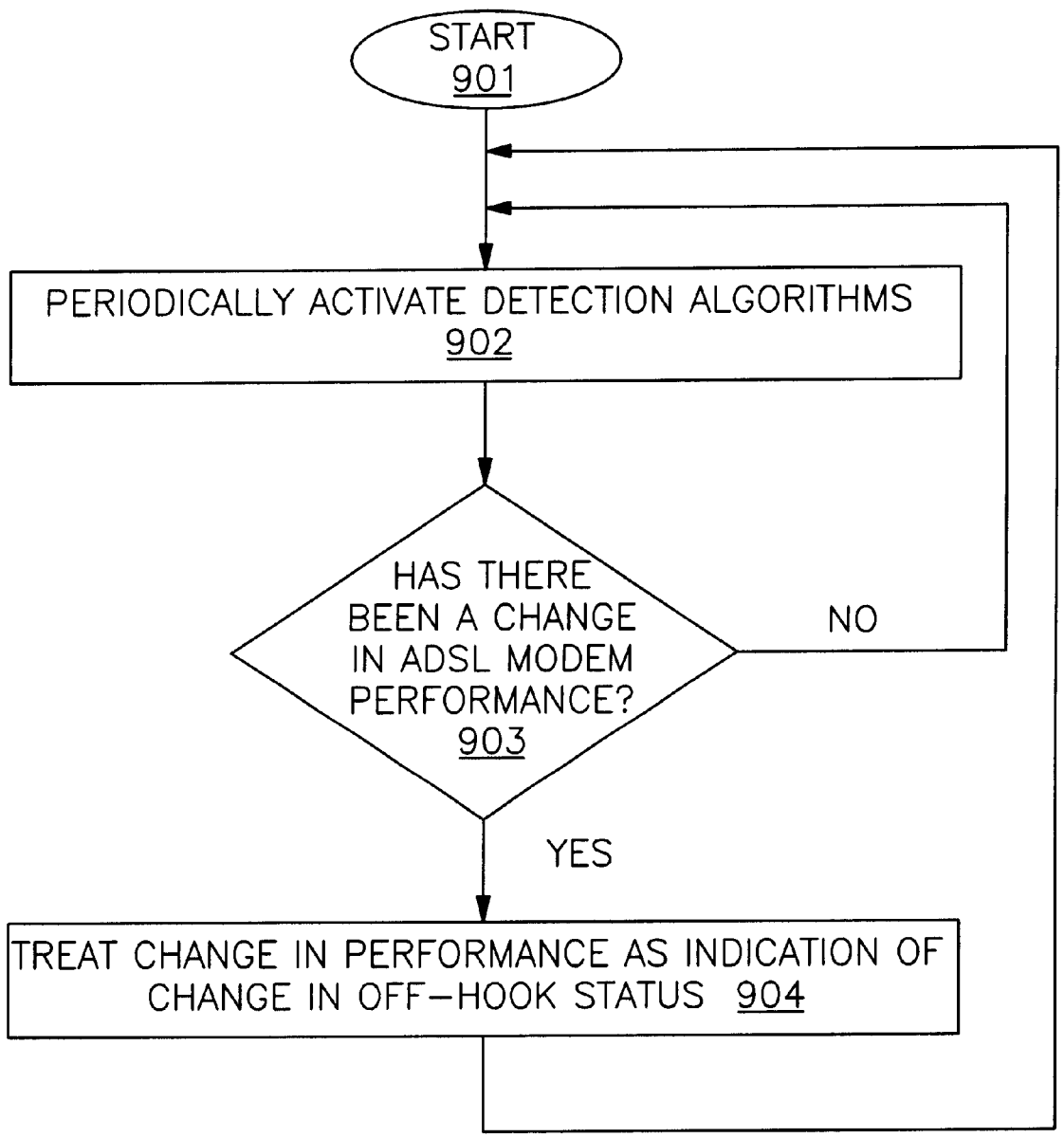
FIG. 9 is a flow diagram illustrating a process for detecting the state of a telephone hookswitch according to one embodiment of the invention.

FIG. 9 is a flow diagram illustrating a process for detecting the state of a telephone hookswitch according to one embodiment of the invention. The process begins in step 901. In step 902, detection routines are periodically activated. These routines attempt to detect changes in ADSL modem operation, such as increased error rates, changes in the measured noise margin, channel response etc. In step 903, a decision is made as to whether or not there has been a change in the ADSL modem parameters. If not, the process returns to step 902. If changes of sufficient magnitude that are sufficiently correlated with one another are detected, the determination is made that there has been a substantial change in ADSL modem performance. In the event of a change in ADSL modem performance, the process continues at step 904. At step 904, the change in ADSL modem performance is treated as an indication of a change in the hookswitch status of telephone instruments coupled to the DSL. This process is useful when an off hook detector is not provided, but may also be used in conjunction with an off hook detector.

Figure 10:
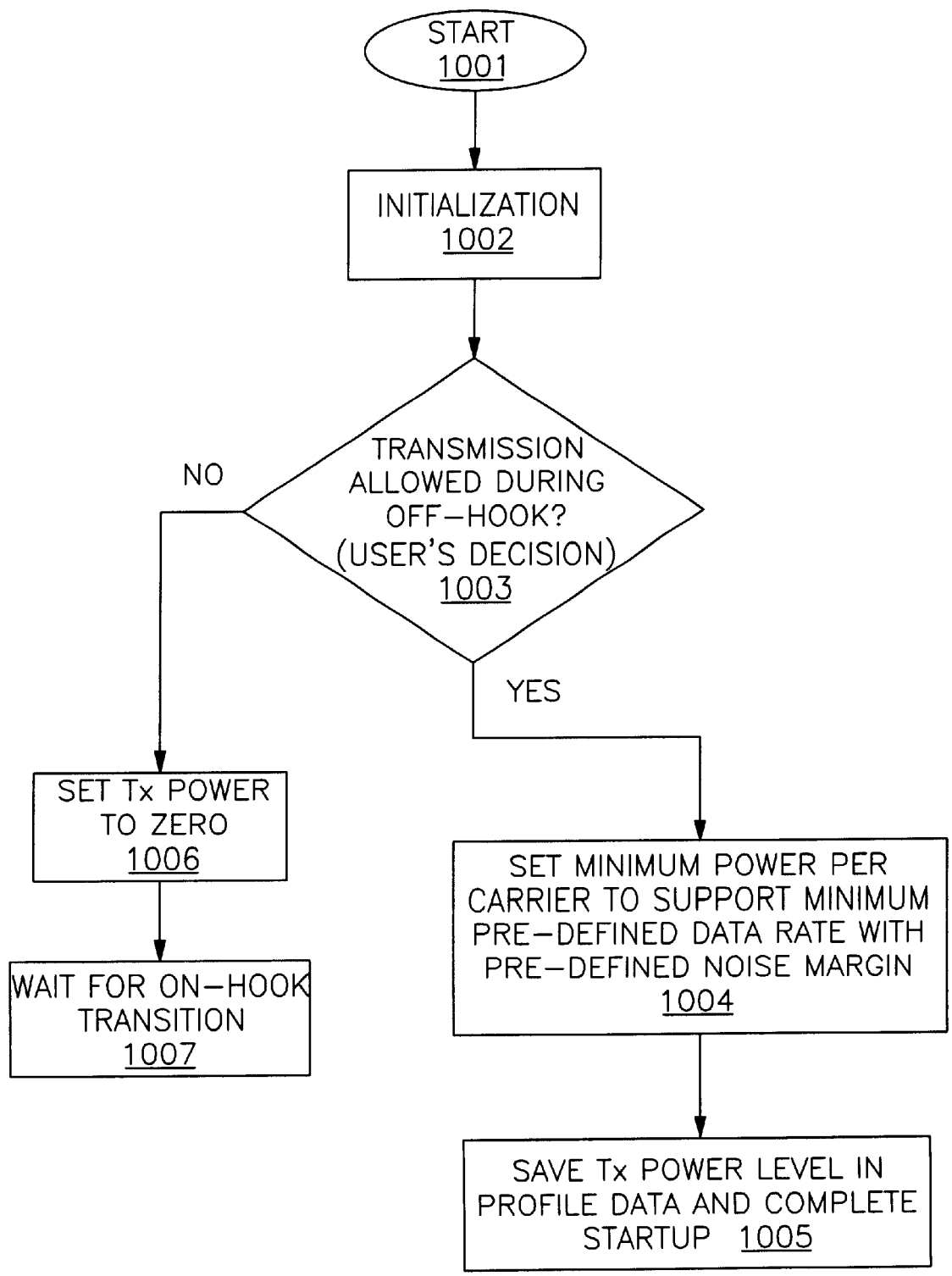
FIG. 10 is a flow diagram illustrating a process for setting the transmit power during the off hook state when an ILF is not installed.

FIG. 10 is a flow diagram illustrating a process for setting the transmit power during the off hook state when an ILF is not installed. The process begins in step 1001. The modem is initialized in step 1002. In step 1003, the off hook setup is tested. Normally, transmission will be allowed during off hook, so step 1004 will follow. In step 1004, the modem optimizes its Tx level to the lowest possible power per carrier that still supports some minimal pre-defined data rate with some pre-defined minimal noise margin. This Tx level is stored in step 1005 as part of the profile data saved for the next fast retrain.

The user is provided with two possibilities. If the selected Tx power is low enough so that no significant disturbance is caused to POTS, then transmission during off hook is possible. If disturbance to POTS is present, then transmission is disabled during off hook and the process moves to step 1006. In step 1006, the Tx power is set to zero. In step 1007 the modem waits until on hook state is detected. Following this on hook detection, a new startup will begin.

Figure 11A:
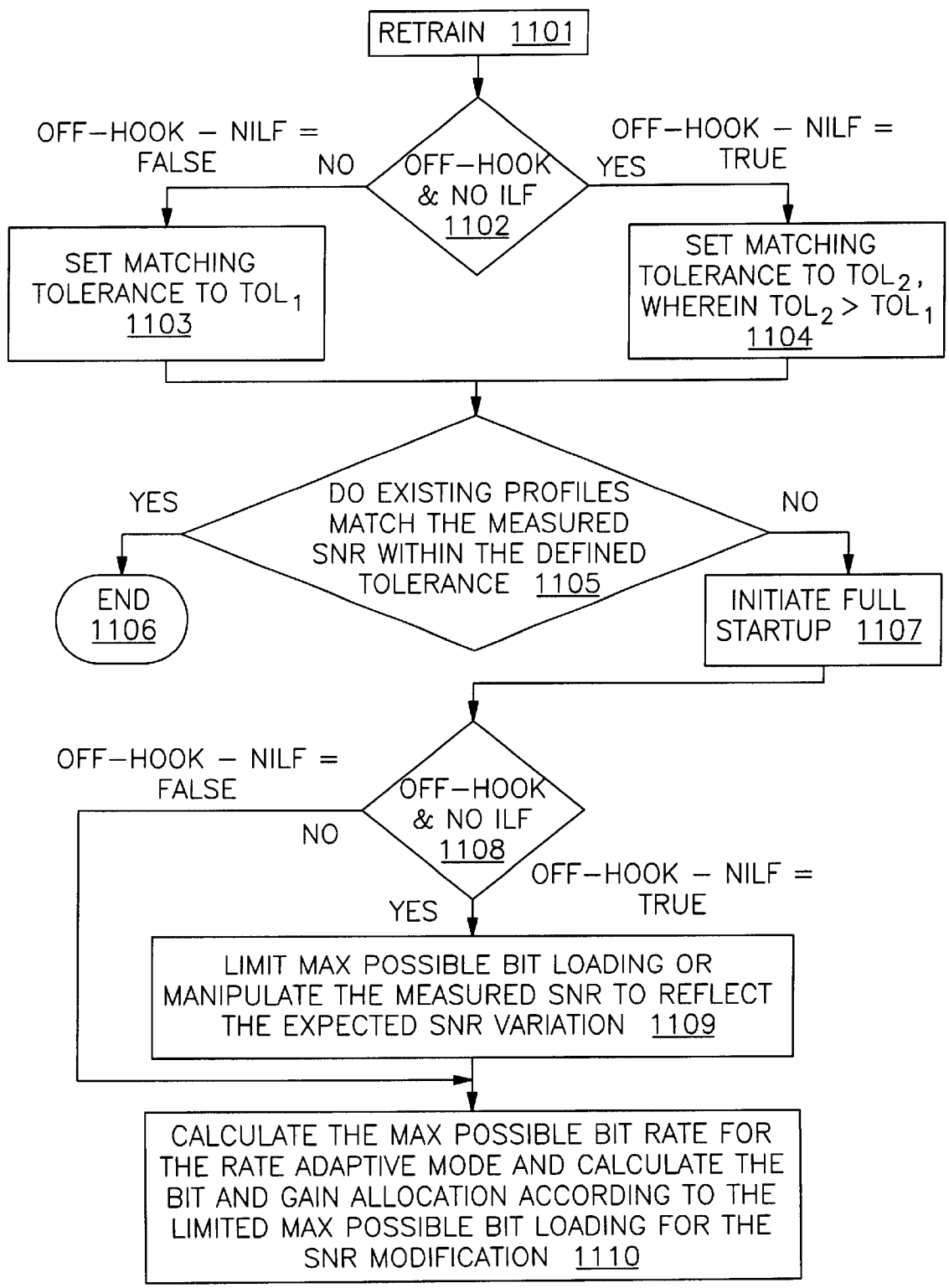
FIG. 11a is a flow diagram illustrating a method of using an OffHook-NILF indication which is communicated from the ATUR to the ATUC.

FIG. 11a is a flow diagram illustrating a method of using an off hook detection of a telephone without an ILF, hereinafter referred to as an "OffHook-NILF indication", which is communicated from the ATUR to the ATUC. This indication informs the ATUC whether a phone, not having an ILF, has been taken off hook. This indication is important because, when a phone not having an ILF has been taken off hook, the signal to noise ratio (SNR) varies significantly over time as a function of the voice signal introduced into the mouthpiece. The fluctuations in SNR can reach approximately 35 b to approximately 40 db so the receiver must be warned in advance that such a change is expected.

The OffHook-NILF indication is used for the following purposes:
  During startup, the OffHook-NILF indication may be used to determined the maximum possible rate calculation. While in rate adaptive mode, a need exists to estimate the maximum possible bit rate that can be supported by the modem for a given noise margin. Due to the fluctuating level of noise there is a risk that the receiver will assume a possible data rate, which is far above the possible bit rate. The receiver must therefore be warned that the SNR is fluctuating and that the relatively high SNR levels may drop within a relatively short time.
  During startup, the OffHook-NILF indicator may be used to determine bits and gains allocation. Bits and gain allocation takes place for both the rate adaptive mode and for the fix rate mode. The allocation takes into account, when applicable, that the SNR that was measured during startup may change significantly in time. Therefore, various measures may be taken by the allocation algorithm to predict the worst case levels of the SNR function. Those measures may include, for example, using a limitation of the max bit loading per carrier or artificially limiting the SNR curve before running the optimal allocation algorithms. Additional measures include synthesizing the SNR curve according to some off line information or based on previous measurements taken by the modem.

During fast retrain, the OffHook-NILF indicator may be used for profile selection. A profile selection process is implemented during fast retrain to identify the profile that best fits the current SNR vector, wherein the profile data includes bits, gains tables and various Reed-Solomon parameters. The profile selection process compares the measured SNR to the bits allocation tables. The algorithm allows only relatively small mismatch, generally less than approximately 1 db, while on hook and a greater mismatch when a phone not having an ILF is taken off hook.

The operation of the OffHook-NILF indication will now be described. It should be noted that the OffHook-NILF indication is communicated to the ATUC side at the first stages of the fast retrain or full startup. Only the relevant parts are shown in FIGS. 11a and b. These figures focus on the indication transmitted from the ATUR to the ATUC and shows how it is used by both sides (ATUR and ATUC) while ignoring other processes that do not need this new indication. The following description is applicable to ATUR and ATUC units. The only difference being that one side detects the OffHook-NILF indication autonomously, while the other side receives the indication.

The process begins in step 1101 during retrain, e.g. fast retrain and/or full retrain. A hook state and in line filter indication is communicated from the ATUR to the ATUC. Alternatively, the hook state and in line filter indication may be communicated from the ATUC to the ATUR. In step 1102, an OffHook-NILF indication determination is made whether the telephone that has been taken off hook has an ILF. The OffHook-NILF=True when the telephone that has been taken off hook does not have an associated ILF, whereas the OffHook-NILF=False, when the telephone that has been taken off hook has an associated ILF. This indication is used in steps 1103 and 1104 to define the matching tolerance used in step 1105, wherein the existing profiles are compared to the current measured conditions. A relatively high first matching tolerance $Tol_2$ is set in step 1104 when OffHook-NILF=True since the conditions may vary significantly over time. On the other hand, a relatively small second matching tolerance $Tol_1$ is set when OffHook-NILF=False, wherein $Tol_2 < Tol_1$.

If the current SNR measurements match within the defined tolerance one of the existing profiles, that profile is selected and the process ends in step 1106, in that the fast retrain continues as normally defined. However, if the current SNR measurements do not match within the defined tolerance to any existing profile, a new (full) startup is initiated as shown in step 1107. As part of the full startup procedure, in step 1108 a determination is made whether the indicator OffHook-NILF is true. If OffHook-NILF=False the sequence continues to step 1110 as is normally done. If OffHook-NILF=True, special care must be taken before calculating the bits and gains allocation. As described above, the fluctuating level of noise in this case is accounted for in step 1109 by limiting the maximum possible bit loading per carrier or by manipulating the measured SNR to reflect the expected worst case variation of the noise. In step 1110, the modified SNR vector and the defined constrains are used to calculate the max possible bit rate (for the rate adaptive mode) and the bits and gains allocation.

Figure 11B:
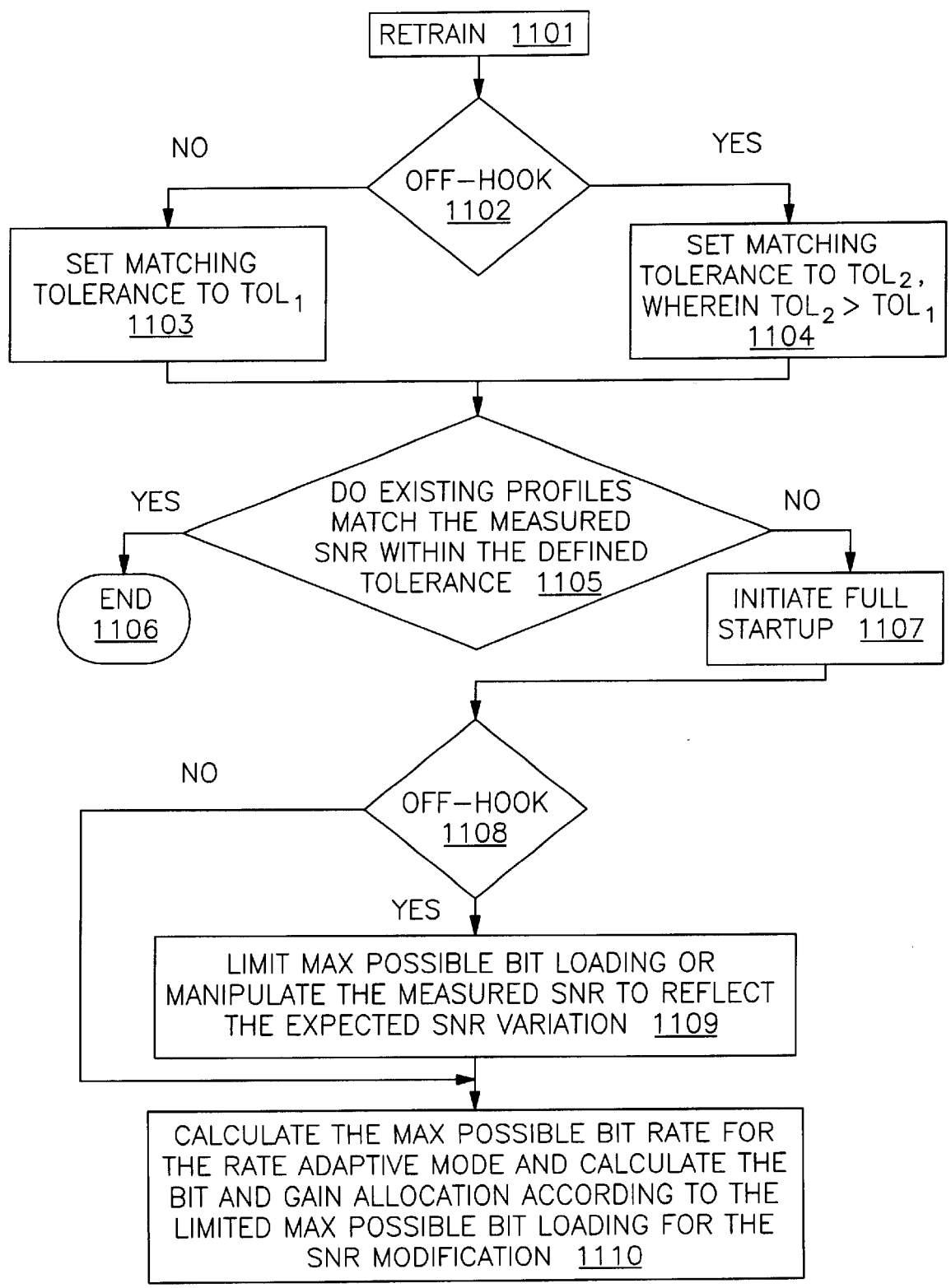
FIG. 11b is a flow diagram of an alternative method of using an off hook indication, regardless of the presence of an associated in line filter, which is communicated from the ATUR to the ATUC.

FIG. 11b is a flow diagram of an alternative method in which upon detecting that a telephone has been taken off hook it is assumed that the telephone does not have an associated ILF and thus, an "OffHook indication", is communicated from the ATUR to the ATUC. Alternatively, the OffHook indication may be communicated from the ATUC to the ATUR. The process is the same as that described above with respect to FIG. 11a, except that in steps 1102' and 1108' a determination is made whether the phone is off hook without determining whether the phone that has been taken off hook phone as an associated ILF. Thus, in this alternative embodiment, every time a telephone is taken off hook it is assumed that it has no associated in line filter and therefore, makes appropriate adjustments to account for the possible fluctuation in noise level.

In a preferred embodiment, two previously reserved bits in R_MSGS and R_MSG_FR1 are dedicated to on/off hook detection. The hook state is therefore communicated, during full startup, from the ATUR to the ATUC using bits 14 and 15 of a 48-bit message signal R_MSGS1 defined as $m=\{m_{47}, m_{46}, \ldots, m_1, m_0\}$. In particular, the possible messages that may be transmitted by the ATUR with these two bits are $\{m_{14}, m_{15}\}$ shall be set to $\{0, 0\}$, if the ATUR does not support hook state detection;

$\{m_{14}, m_{15}\}$ shall be set to $\{1, 0\}$, if the ATUR detects an off hook state;

$\{m_{14}, m_{15}\}$ shall be set to $\{0, 1\}$, if the ATUR detects an on-hook state;

$\{m_{14}, m_{15}\}$ shall be set to $\{1, 1\}$, if the ATUR can not determine the hook state.

The hook state may also be passed from the ATUR to the ATUC, during fast retrain, in bits 6 and 7 of a 16-bit message R_MSG_FR1 to aid the ATUC in profile selection. The R_MSG_FR1 message is defined as $m=\{u_7, \ldots, u_1, u_0, d_7, \ldots, d_1, d_0\}$. These bits shall indicate the following possible permutations $\{d_6, d_7\}$ shall be set to $\{0, 0\}$, if the ATUR does not support hook state detection;

$\{d_6, d_7\}$ shall be set to $\{1, 0\}$, if the ATUR detects an off hook state;

$\{d_6, d_7\}$ shall be set to $\{0, 1\}$, if the ATUR detects an on-hook state;

$\{d_6, d_7\}$ shall be set to $\{1, 1\}$, if the ATUR can not determine the hook state.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method using, during at least one of fast retrain and full retrain, an off hook detection of a telephone without an in line filter, comprising the steps of:

(a) communicating a hook state and in line filter indication from an asymmetrical digital subscriber line transceiver unit remote side to an asymmetrical digital subscriber line transceiver unit central office side;

(b) setting a predetermined matching tolerance based on whether the telephone that has been taken off hook has an associated in line filter, said matching tolerance being set to a first predetermined matching tolerance, when the telephone taken off hook has an associated in line filter, and a second predetermined matching tolerance, greater than the first predetermined tolerance, when the telephone taken off hook does not have an associated in line filter; and (c) determining when a current signal to noise ratio measurement does not match within the set matching tolerance a predefined profile.

2. The method of claim 1, further comprising the steps of:
(d) initiating full startup;
(e) detecting when the telephone taken off hook does not have an associated in line filter;
(f) limiting a maximum possible bit loading per carrier to account for the fluctuating level of noise; and
(g) calculating a maximum possible bit rate for a rate adaptive mode and a bit and gain allocation, based on the limited maximum possible bit loading.

3. The method of claim 1, further comprising the steps of:
(d) initiating full startup;
(e) detecting when the telephone taken off hook does not have an associated in line filter;
(f) modifying a measured signal to noise ratio to account for an expected signal to noise ratio variation resulting from a fluctuating level of noise; and
(g) calculating a maximum possible bit rate for a rate adaptive mode and a bit and gain allocation, based on the modified signal to noise ratio.

4. A method for using, during at least one of fast retrain and full retrain, an off hook detection of a telephone, comprising the steps of:

(a) communicating a hook state indication from an asymmetrical digital subscriber line transceiver unit remote side to an asymmetrical digital subscriber line transceiver unit central office side;

(b) setting a predetermined matching tolerance based on whether the telephone has been taken off hook, said matching tolerance being set to a first predetermined matching tolerance, when the telephone is on hook, and a second predetermined matching tolerance, greater than the first predetermined tolerance, when the telephone has been taken off hook; and (c) determining when a current signal to noise ratio measurement does not match within the set matching tolerance a predefined profile.

5. The method of claim 4, further comprising the steps of:
(d) initiating full startup;
(e) detecting when the telephone has been taken off hook;
(f) limiting a maximum possible bit loading per carrier to account for the fluctuating level of noise; and
(g) calculating a maximum possible bit rate for a rate adaptive mode and a bit and gain allocation, based on the limited maximum possible bit loading.

6. The method of claim 4, further comprising the steps of:
(d) initiating full startup;
(e) detecting when the telephone has been taken off hook;
(f) modifying a measured signal to noise ratio to account for an expected signal to noise ratio variation resulting from a fluctuating level of noise; and (g) calculating a maximum possible bit rate for a rate adaptive mode and a bit and gain allocation, based on the modified signal to noise ratio.

7. A method using, during at least one of fast retrain and full retrain, an off hook detection of a telephone without an in line filter, comprising the steps of:

(a) communicating a hook state and in line filter indication from an asymmetrical digital subscriber line transceiver unit central office side to an asymmetrical digital subscriber line transceiver unit remote side;

(b) setting a predetermined matching tolerance based on whether the telephone that has been taken off hook has an associated in line filter, said matching tolerance being set to a first predetermined matching tolerance, when the telephone taken off hook has an associated in line filter, and a second predetermined matching tolerance, greater than the first predetermined tolerance, when the telephone taken off hook does not have an associated in line filter; and (c) determining when a current signal to noise ratio measurement does not match within the set matching tolerance a predefined profile.

8. The method of claim 7, further comprising the steps of:
(d) initiating full startup;
(e) detecting when the telephone taken off hook does not have an associated in line filter;
(f) limiting a maximum possible bit loading per carrier to account for the fluctuating level of noise; and
(g) calculating a maximum possible bit rate for a rate adaptive mode and a bit and gain allocation, based on the limited maximum possible bit loading.

9. The method of claim 7, further comprising the steps of:
(d) initiating full startup;
(e) detecting when the telephone taken off hook does not have an associated in line filter;
(f) modifying a measured signal to noise ratio to account for an expected signal to noise ratio variation resulting from a fluctuating level of noise; and
(g) calculating a maximum possible bit rate for a rate adaptive mode and a bit and gain allocation, based on the modified signal to noise ratio.

10. A method for using, during at least one of fast retrain and full retrain, an off hook detection of a telephone, comprising the steps of:

(a) communicating a hook state indication from an asymmetrical digital subscriber line transceiver unit central office side to an asymmetrical digital subscriber line transceiver unit remote side;

(b) setting a predetermined matching tolerance based on whether the telephone has been taken off hook, said matching tolerance being set to a first predetermined matching tolerance, when the telephone is on hook, and a second predetermined matching tolerance, greater than the first predetermined tolerance, when the telephone has been taken off hook; and (c) determining when a current signal to noise ratio measurement does not match within the set matching tolerance a predefined profile.

11. The method of claim 10, further comprising the steps of:
(d) initiating full startup;
(e) detecting when the telephone has been taken off hook;
(f) limiting a maximum possible bit loading per carrier to account for the fluctuating level of noise; and (g) calculating a maximum possible bit rate for a rate adaptive mode and a bit and gain allocation, based on the limited maximum possible bit loading.

12. The method of claim 10, further comprising the steps of:
(d) initiating full startup;
(e) detecting when the telephone has been taken off hook;
(f) modifying a measured signal to noise ratio to account for an expected signal to noise ratio variation resulting from a fluctuating level of noise; and
(g) calculating a maximum possible bit rate for a rate adaptive mode and a bit and gain allocation, based on the modified signal to noise ratio.

* * * * *

UNITED STATES PATENT AND TRADEMARK OFFICE
CERTIFICATE OF CORRECTION

PATENT NO.    : 6,520,744 B1                                      Page 1 of 1
DATED         : February 18, 2003
INVENTOR(S)   : Rami Verbin et al.

It is certified that error appears in the above-identified patent and that said Letters Patent is hereby corrected as shown below:

<u>Title page,</u>
Item [73], Assignee, delete "Orckit Communications Ltd., Tel-Aviv (IL)" and substitute -- Tioga Technologies Ltd., Tel-Aviv (IL) --

Signed and Sealed this

Nineteenth Day of August, 2003

JAMES E. ROGAN
*Director of the United States Patent and Trademark Office*